(12) United States Patent
Suzuki et al.

(10) Patent No.: US 6,489,059 B2
(45) Date of Patent: Dec. 3, 2002

(54) ALKALINE STORAGE BATTERY AND POSITIVE ELECTRODE USED FOR THE ALKALINE STORAGE BATTERY

(75) Inventors: Tatsuhiko Suzuki, Kamakura (JP); Yoshitaka Dansui, Fujisawa (JP); Hideki Kasahara, Naka-gun (JP); Kohji Yuasa, Chigasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 36 days.

(21) Appl. No.: 09/794,121

(22) Filed: Feb. 28, 2001

(65) Prior Publication Data

US 2001/0024751 A1 Sep. 27, 2001

(30) Foreign Application Priority Data

Mar. 21, 2000 (JP) ........................ 2000-077608

(51) Int. Cl.$^7$ ................................................. H01M 4/32
(52) U.S. Cl. ....................................................... 429/223
(58) Field of Search ........................ 429/223; 423/594; 252/521.2, 182.1; 205/60

(56) References Cited

U.S. PATENT DOCUMENTS

| 5,670,271 A | * | 9/1997 | Axmann | 423/140 |
| 5,773,169 A | * | 6/1998 | Matsuda et al. | 429/223 |
| 6,228,535 B1 | * | 5/2001 | Fierro et al. | 429/220 |

FOREIGN PATENT DOCUMENTS

| EP | 1006598 A2 | * | 6/2000 |
| JP | 50-36935 | | 4/1975 |
| JP | 8-148145 | | 6/1996 |
| JP | 9-73900 | | 3/1997 |
| JP | 9-92279 | | 4/1997 |

* cited by examiner

*Primary Examiner*—Patrick Ryan
*Assistant Examiner*—Susy Tsang-Foster
(74) *Attorney, Agent, or Firm*—Stevens, Davis, Miller & Mosher, LLP

(57) ABSTRACT

An alkaline storage battery using positive electrodes comprising an active material containing nickel hydroxide particles and a rare earth element or a compound thereof containing or mixed with 0.1–100 ppm of Fe or an Fe compound based on the rare earth element or the compound thereof is provided.

20 Claims, 2 Drawing Sheets

ALKALINE STORAGE BATTERY AND POSITIVE ELECTRODE USED FOR THE ALKALINE STORAGE BATTERY

BACKGROUND OF THE INVENTION

1. Field of the Invention

The present invention relates to an alkaline storage battery, and particularly to an improvement of positive electrode used for the battery.

2. Description of Related Art

With the recent spread of portable devices, alkaline storage batteries are demanded to have higher capacity. Particularly, nickel metal hydride storage batteries are secondary batteries which comprise positive electrodes mainly composed of nickel hydroxide and negative electrodes mainly composed of a hydrogen-absorbing alloy, and they have spread as secondary batteries of high capacity and high reliability.

The positive electrodes for the alkaline storage batteries will be explained below.

The positive electrodes for alkaline storage batteries are roughly classified into two types of sintered type and unsintered type. The former are prepared by sintering a core material such as a punching metal and a nickel powder to obtain a nickel sintered substrate having a porosity of about 80%, impregnating the resulting substrate with an aqueous solution of a nickel salt such as aqueous nickel nitrate solution and then dipping the substrate in an aqueous alkali solution, thereby to produce nickel hydroxide in the porous nickel sintered substrate. Since the porosity of the substrate in the positive electrodes cannot be increased to more than the above porosity, amount of the nickel hydroxide cannot be increased and there is the limit in increase of capacity.

The latter unsintered type positive electrodes are prepared by holding nickel hydroxide particles as an active material in a three-dimensionally continuing foamed porous substrate having a porosity of not less than 95% as disclosed in JP-A-50-36935, and, at present, they are widely used as positive electrodes of secondary batteries of high capacity. In these unsintered type positive electrodes, the porous substrate is filled with spherical nickel hydroxide from the point of attainment of high capacity.

Moreover, it is generally conducted to use a metal ion such as cobalt, cadmium, zinc or the like which is dissolved in the nickel hydroxide particles to partially form a solid solution for the improvement of discharge characteristics, receptivity for charging and life characteristics.

The pore size of the foamed porous substrate is about 200–500 $\mu$m, and the pores are filled with spherical nickel hydroxide having a particle diameter of several $\mu$m to several ten $\mu$m. In nickel hydroxide in the vicinity of the nickel metal skeleton, collection of electricity is maintained and the charge and discharge reaction smoothly proceeds. However, the reaction of nickel hydroxide apart from the skeleton does not proceed sufficiently. Therefore, in order to improve utilization ratio of the nickel hydroxide, a conductive agent is used to perform satisfactory electrical connection of the nickel hydroxide particles which are apart from the skeleton.

Cobalt compounds such as cobalt hydroxide and cobalt monoxide, metallic cobalt, metallic nickel and the like are used as the conductive agent. Thus, it becomes possible to fill the active material at a high density in unsintered type positive electrodes and improve utilization ratio, and capacity can be increased as compared with the sintered type positive electrodes.

Furthermore, JP-A-8-148145 discloses a method for producing an active material of a positive electrode for high capacity nickel-hydrogen storage batteries which are excellent in overdischarge characteristics and meet the market demand for improvement of cycle characteristics, which comprises coating a cobalt compound on an active material nickel hydroxide and subjecting the cobalt compound to an alkali oxidation treatment to convert the compound to a higher order cobalt compound, and JP-A-9-73900 discloses an improvement of the above method.

According to these methods, the nickel hydroxide powder coated with the cobalt compound is sprayed with an aqueous alkali solution under fluidization or dispersion in the heated air. As a result, it has become possible to make alkaline storage batteries of high energy density which are improved in utilization ratio of active material and battery characteristics such as high rate discharge characteristics as compared with the conventional methods in which the cobalt compound is added as an external additive.

Moreover, in alkaline storage batteries, a phenomenon of reduction of charging efficiency occurs when temperature of the batteries is high. For solving this problem, the electrolyte used in nickel-hydrogen storage batteries is optimized or calcium compounds or rare earth oxides such as yttrium oxide and ytterbium oxide which improve high-temperature charging efficiency are added to positive electrode active materials. This is disclosed, for example, in JP-A-9-92279.

BRIEF SUMMARY OF THE INVENTION

The above construction can provide high capacity and can improve charging efficiency at high temperatures, but there has still been a problem of reduction of discharge characteristics.

The main object of the present invention is to provide an alkaline storage battery improved in discharge characteristics with maintaining the discharging efficiency at high temperatures. These and other objects of the present invention will be readily apparent from the description of the invention.

For attaining the above object, the present invention provides an alkaline storage battery which uses a positive electrode comprising an active material containing nickel hydroxide particles and a rare earth element or a compound thereof containing a trace amount of Fe or a Fe compound.

According to the above construction, it becomes possible to provide an alkaline storage battery improved in discharge characteristics with maintaining the charging efficiency at high temperatures.

DETAILED DESCRIPTION OF THE INVENTION

Figure 1:
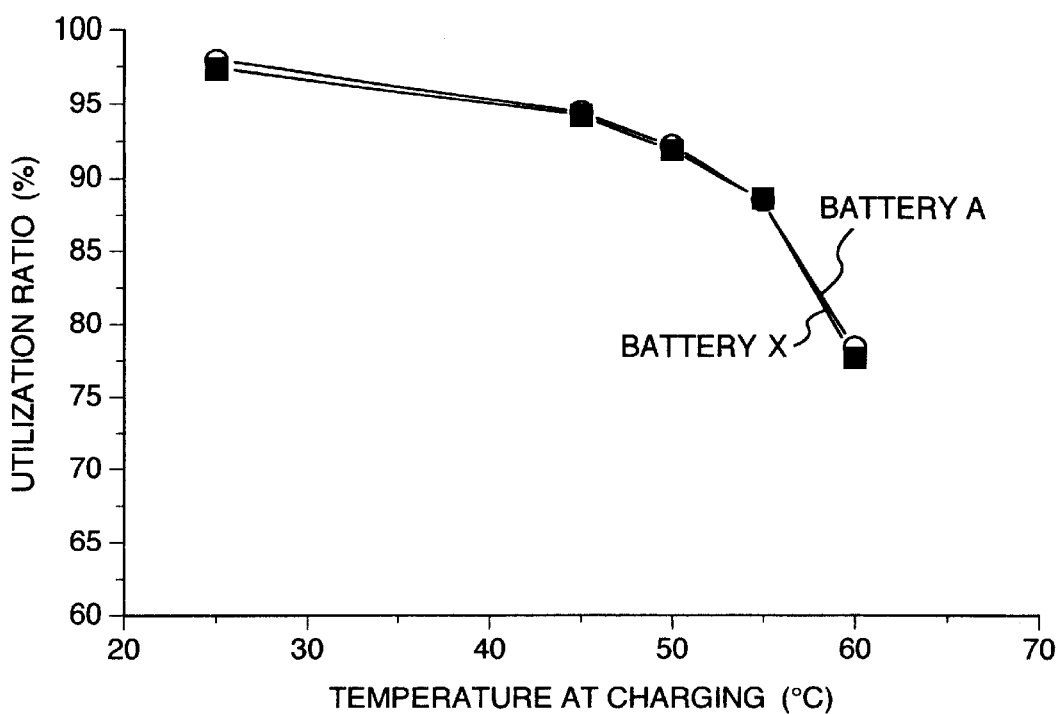
FIG. 1 is a graph which shows a relation between the temperature at charging and the utilization ratio in Example 1.

The first embodiment of the present invention is that the active material of positive electrode used in alkaline storage batteries contains nickel hydroxide particles and a rare earth element or a compound thereof containing Fe or an Fe compound, and the content of Fe or Fe compound is 0.1–100 ppm based on the rare earth element or the compound thereof.

The second embodiment of the present invention is that the active material of positive electrode used in alkaline storage batteries contains a mixture of nickel hydroxide particles, a rare earth element or a compound thereof, and Fe or an Fe compound. The content of Fe or Fe compound is 0.1–100 ppm based on the rare earth element or the compound thereof.

The third embodiment of the present invention is an alkaline storage battery containing the positive electrode of the above first embodiment. Specifically the alkaline storage battery is composed of a positive electrode comprising a positive electrode active material containing nickel hydroxide particles and a rare earth element or a compound thereof containing Fe or an Fe compound, the content of said Fe or Fe compound being 0.1–100 ppm based on the rare earth element or the compound thereof, a negative electrode, a separator and an alkaline electrolyte.

The fourth embodiment of the present invention is an alkaline storage battery containing the positive electrode of the above second embodiment. Specifically the alkaline storage battery is composed of a positive electrode comprising a positive electrode active material containing nickel hydroxide particles, of a rare earth element or a compound thereof and Fe or an Fe compound, the content of said Fe or Fe compound being 0.1–100 ppm based on the rare earth element or the compound thereof, a negative electrode, a separator and an alkaline electrolyte.

In the above embodiments, nickel hydroxide particles may contain a metal element such as cobalt, cadmium, zinc, manganese, aluminum, chromium, calcium or the like as a solid solution. Amount of the element dissolved is not limited, but is preferably 3–15 mol %.

Furthermore, the surface of the nickel hydroxide particles may be coated with a cobalt compound or the like.

Content of the rare earth element or the compound thereof is preferably 0.1–10% by weight based on the nickel hydroxide particles.

The rare earth element includes preferably at least one element of Ho, Er, Tm, Yb, Lu and Y.

The compound of rare earth element is preferably an oxide, a hydroxide or a fluoride.

Furthermore, the positive electrode of the present invention may contain known additives for positive electrode, such as cobalt hydroxide, zinc oxide and the like.

The present invention may be a sub-combination of these described features.

EXAMPLES

The present invention will be explained in detail by the following examples, which are not intended to limit to the scope of the invention, and various changes may be made in details within the principle and scope of the invention.

Example 1

An aqueous sodium hydroxide solution was added dropwise to an aqueous ytterbium nitrate solution containing iron (II) sulfate with stirring and with keeping pH in the range of 11–14 to obtain ytterbium hydroxide powder A containing iron (III) hydroxide. Composition of the powder A was examined to find that it contained iron (III) hydroxide in an amount of 10 ppm based on ytterbium hydroxide in weight ratio.

Then, 300 g of spherical nickel hydroxide powder, 30 g of cobalt hydroxide, 6 g of zinc oxide, 6 g of the above powder A and water were mixed to prepare a paste. A foamed metal was filled with this paste, followed by drying, rolling and cutting to a size for a battery of F-AA size to make a positive electrode plate.

Then, a paste prepared by mixing a hydrogen-absorbing alloy of $AB_5$ type with 1 wt % of a carbon material, 1 wt % of PTFE and water was coated on a substrate and dried, followed by rolling and cutting to a size for a battery of F-AA size to make a negative electrode plate.

These positive and negative electrode plates were rolled in spiral form with a nonwoven fabric made of polypropylene subjected to hydrophilizing treatment as a separator interposed between the plates, thereby forming a plate group. The plate group was disposed in a battery case and the case was filled with 8 mol/l of an aqueous sodium hydroxide solution. Thereafter, the case was sealed at the upper part with a sealing plate to make a nickel-hydrogen storage battery of F-AA size having a rated capacity of 1300 mAh. This battery was referred to as battery A.

Then, a battery X of comparative example was made in the same manner as above, except that iron (II) sulfate was not added in preparing the powder A.

These batteries were charged at 130 mA in the atmospheres of 25° C., 45° C., 50° C., 55° C. and 60° C., and hen the temperature was lowered to 25° C. and the batteries were discharged at 260 mA. FIG. 1 shows utilization ratio (the ratio of actual discharge capacity/theoretical capacity of positive electrode which was shown in percentage) at each temperature.

Figure 2:
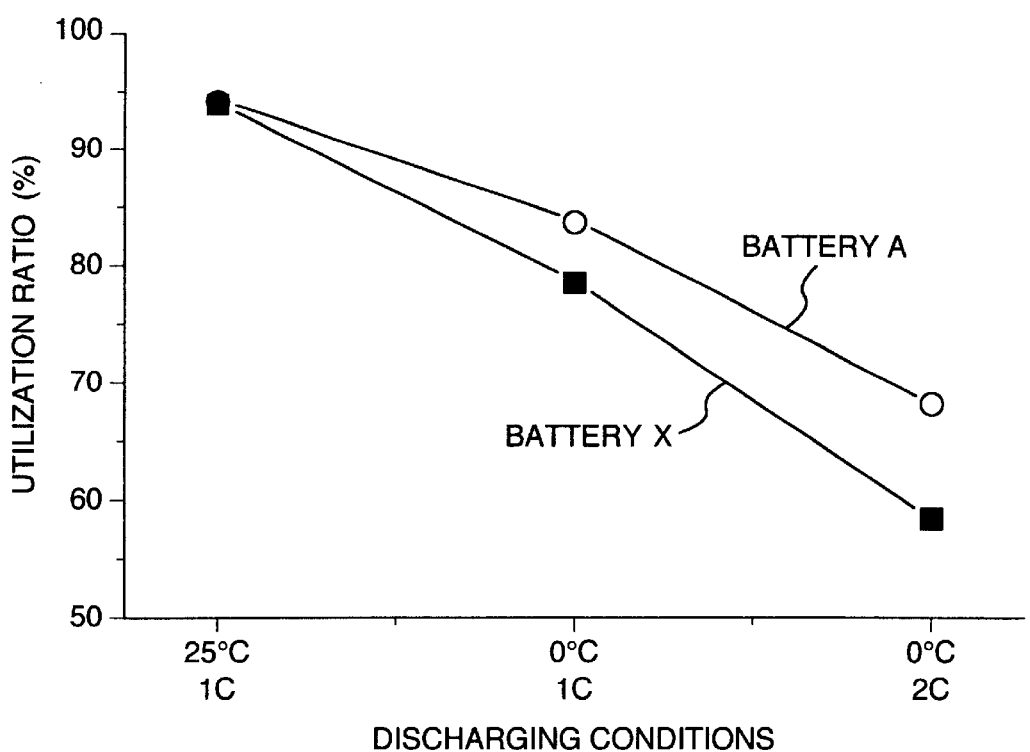
FIG. 2 is a graph which shows a relation between each discharging condition and the utilization ratio in Example 1.

Then, these batteries were charged at 130 mA in an atmosphere of 25° C., and discharged at 1300 mA and at 25° C. and 0° C., and, besides, discharged at 2600 mA and at 0° C. FIG. 2 shows utilization ratio at each temperature.

As is clear from FIG. 1 and FIG. 2, in the case of the battery of the present invention, when the temperature was raised to 25–60° C., the similar charging efficiencies to those of the comparative battery were obtained, and furthermore the low-temperature discharge characteristics at 0° C. and the high rate discharge characteristics at 2 C. were superior to those of the comparative battery. It was confirmed that the battery A containing iron (III) hydroxide was higher in discharge voltage than the battery X containing no iron (III) hydroxide.

Example 2

Positive electrodes containing iron (III) hydroxide in the amounts of 0.1, 0.5, 1.0, 5.0, 10, 50, 100, 150 and 200 ppm based on ytterbium hydroxide in weight ratio were made and nickel-hydrogen storage batteries of F-AA size were fabricated in the same manner as in Example 1.

Figure 3:
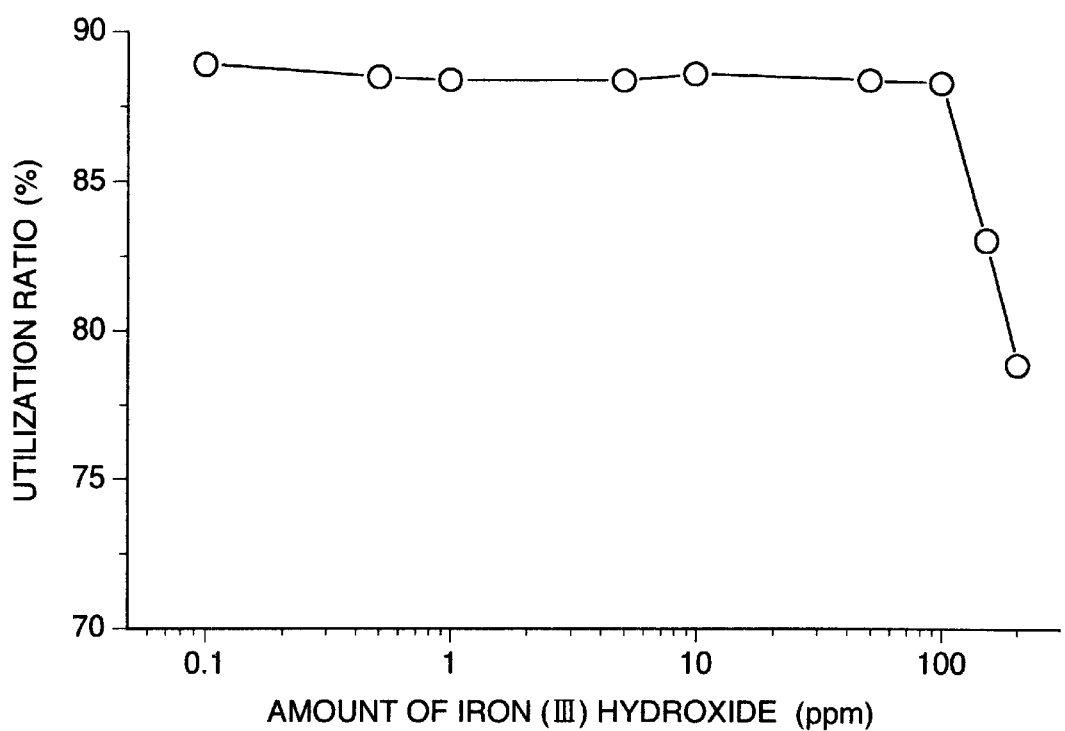
FIG. 3 is a graph which shows a relation between the content of iron (III) hydroxide and the utilization ratio at the time of charging in an atmosphere of 55° C. in Example 2.
Figure 4:
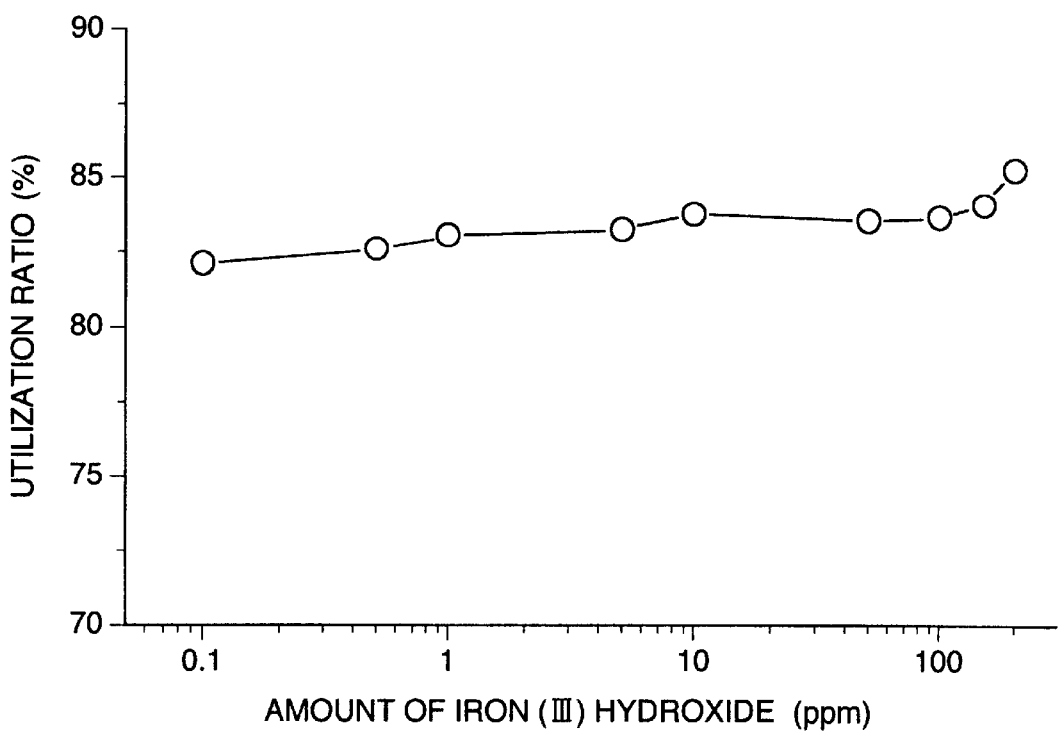
FIG. 4 is a graph which shows a relation between the content of iron (III) hydroxide and the utilization ratio at the time of charging at 1 C. and at 0° C. in Example 2.

These batteries were charged at 130 mA in an atmosphere of 55° C., and then the temperature was lowered to 25° C. and the batteries were discharged at 260 mA. The utilization ratio in this case is shown in FIG. 3. Then, these batteries were charged at 130 mA in an atmosphere of 25° C., and the temperature was lowered to 0° C. and the batteries were discharged at 1300 mA. FIG. 4 shows utilization ratios at the respective contents of iron (III) hydroxide at the time of discharging at 1 C. and at 0° C. As is clear from FIG. 3 and FIG. 4, when the content of iron (III) hydroxide was in the range of 0.1–200 ppm, the discharge characteristics were improved. However, when iron (III) hydroxide was added in an amount of more than 100 ppm, the charging efficiency was deteriorated, and thus it can be seen that 0.1–100 ppm is a preferred range.

It is considered that the discharge characteristics were improved in this Example because iron (III) hydroxide was contained in ytterbium hydroxide. It is presumed that this effect was obtained by the increase of discharge voltage caused by synergistic action of iron (III) hydroxide and ytterbium hydroxide performing a dissolution and precipitation reaction in the electrolyte. The above effect is not obtained when iron (III) hydroxide is contained in, for example, nickel hydroxide.

In the above Examples, ytterbium hydroxide was used, but the similar effect can also be obtained when a single substance of ytterbium or oxides, fluorides or the like of ytterbium are used, and the similar effect can also be obtained when single substances or oxides, hydroxides, fluorides or the like of other rare earth elements are used. Other rare earth elements are preferably Ho, Er, Tm, Lu and Y, and content thereof is preferably 0.1–10% by weight based on the nickel hydroxide particles.

Furthermore, in the Examples, iron (III) hydroxide was used, but the similar effect can also be used when a single substance of iron or oxides, fluorides or the like of iron are used.

As the alkaline electrolyte, aqueous sodium hydroxide solution was used, but the similar effect can also be obtained when potassium hydroxide or lithium hydroxide each alone or a mixed aqueous solution thereof is used.

Moreover, cobalt hydroxide or zinc oxide was merely used as one example and does not limit the invention. Furthermore, the similar effect can also be obtained by using a nickel-cadmium storage battery, not the nickel metal hydride storage battery.

As explained above, alkaline storage batteries improved in discharge characteristics as well as in high temperature area can be provided by using a positive electrode comprising the positive electrode active material of the present invention to which is added a rare earth element or a compound thereof containing Fe or an Fe compound.

What is claimed is:

1. A positive electrode for alkaline storage batteries which contains nickel hydroxide particles and a rare earth element or a compound thereof containing Fe or an Fe compound, the content of said Fe or Fe compound being 0.1–100 ppm based on the rare earth element or the compound thereof.

2. A positive electrode for alkaline storage batteries which contains a mixture of nickel hydroxide particles, a rare earth element or a compound thereof, and Fe or an Fe compound, the content of said Fe or Fe compound being 0.1–100 ppm based on the rare earth element or the compound thereof.

3. A positive electrode for alkaline storage batteries according to claim 1, wherein the content of the rare earth element or the compound thereof is 0.1–10% by weight based on the nickel hydroxide particles.

4. A positive electrode for alkaline storage batteries according to claim 1, wherein the rare earth element comprises at least one element selected from the group consisting of Ho, Er, Tm, Yb, Lu and Y.

5. A positive electrode for alkaline storage batteries according to claim 1, wherein the compound of the rare earth element is an oxide, a hydroxide or a fluoride.

6. An alkaline storage battery which comprises a positive electrode containing nickel hydroxide particles and a rare earth element or a compound thereof containing Fe or an Fe compound, the content of said Fe or Fe compound being 0.1–100 ppm based on the rare earth element or the compound thereof, a negative electrode, a separator and an alkaline electrolyte.

7. An alkaline storage battery which comprises a positive electrode containing a mixture of nickel hydroxide particles, a rare earth element or a compound thereof and Fe or an Fe compound, the content of said Fe or Fe compound being 0.1–100 ppm based on the rare earth element or the compound thereof, a negative electrode, a separator and an alkaline electrolyte.

8. An alkaline storage battery according to claim 6, wherein the content of the rare earth element or the compound thereof is 0.1–10% by weight based on the nickel hydroxide particles.

9. An alkaline storage battery according to claim 6, wherein the rare earth element comprises at least one element selected from the group consisting of Ho, Er, Tm, Yb, Lu and Y.

10. An alkaline storage battery according to claim 6, wherein the compound of the rare earth element is an oxide, a hydroxide or a fluoride.

11. A positive electrode for alkaline storage batteries according to claim 2, wherein the content of the rare earth element or the compound thereof is 0.1–10% by weight based on the nickel hydroxide particles.

12. A positive electrode for alkaline storage batteries according to claim 2, wherein the rare earth element comprises at least one element selected from the group consisting of Ho, Er, Tm, Yb, Lu and Y.

13. A positive electrode for alkaline storage batteries according to claim 3, wherein the rare earth element comprises at least one element selected from the group consisting of Ho, Er, Tm, Yb, Lu and Y.

14. A positive electrode for alkaline storage batteries according to claim 11, wherein the rare earth element comprises at least one element selected from the group consisting of Ho, Er, Tm, Yb, Lu and Y.

15. A positive electrode for alkaline storage batteries according to claim 2, wherein the compound of the rare earth element is an oxide, a hydroxide or a fluoride.

16. A positive electrode for alkaline storage batteries according to claim 3, wherein the compound of the rare earth element is an oxide, a hydroxide or a fluoride.

17. A positive electrode for alkaline storage batteries according to claim 11, wherein the compound of the rare earth element is an oxide, a hydroxide or a fluoride.

18. An alkaline storage battery according to claim 7, wherein the content of the rare earth element or the compound thereof is 0.1–10% by weight based on the nickel hydroxide particles.

19. An alkaline storage battery according to claim 7, wherein the rare earth element comprises at least one element selected from the group consisting of Ho, Er, Tm, Yb, Lu and Y.

20. An alkaline storage battery according to claim 7, wherein the compound of the rare earth element is an oxide, a hydroxide or a fluoride.

* * * * *